US009030324B2

(12) United States Patent
Christiansen et al.

(10) Patent No.: US 9,030,324 B2
(45) Date of Patent: May 12, 2015

(54) SYSTEM AND METHOD FOR TRACKING PIPE ACTIVITY ON A RIG

(75) Inventors: Ted Louis Christiansen, Houston, TX (US); Jaroslav Belik, Pearland, TX (US)

(73) Assignee: National Oilwell Varco, L.P., Houston, TX (US)

( * ) Notice: Subject to any disclaimer, the term of this patent is extended or adjusted under 35 U.S.C. 154(b) by 621 days.

(21) Appl. No.: 13/399,225

(22) Filed: Feb. 17, 2012

(65) Prior Publication Data

US 2012/0212326 A1 Aug. 23, 2012

Related U.S. Application Data

(60) Provisional application No. 61/443,790, filed on Feb. 17, 2011.

(51) Int. Cl.
*E21B 17/00* (2006.01)
*H04Q 9/00* (2006.01)
*G06K 7/10* (2006.01)

(52) U.S. Cl.
CPC ............... *E21B 17/006* (2013.01); *H04Q 9/00* (2013.01); *H04Q 2209/47* (2013.01); *G06K 7/10009* (2013.01)

(58) Field of Classification Search
USPC ........ 340/572.1, 573.3, 825.15, 572.8, 572.4, 340/12.18, 4.36
See application file for complete search history.

(56) References Cited

U.S. PATENT DOCUMENTS

| | | | |
|---|---|---|---|
| 1,419,115 A * | 6/1922 | Avery | 294/90 |
| 1,570,812 A * | 1/1926 | Wilson | 294/90 |
| 1,662,429 A | 3/1928 | Lowy | |
| 1,842,026 A * | 1/1932 | Hulshizer | 24/463 |
| 4,468,959 A * | 9/1984 | Roberts | 73/152.01 |
| 4,617,876 A * | 10/1986 | Hayes | 119/842 |
| 4,698,631 A * | 10/1987 | Kelly et al. | 340/853.1 |
| 5,202,680 A * | 4/1993 | Savage | 340/853.1 |
| 5,221,831 A * | 6/1993 | Geiszler | 235/440 |
| 5,249,252 A | 9/1993 | Noto | |
| 5,360,967 A | 11/1994 | Perkin et al. | |
| 6,536,524 B1 * | 3/2003 | Snider | 166/297 |

(Continued)

FOREIGN PATENT DOCUMENTS

| | | |
|---|---|---|
| WO | 2011/017278 A1 | 2/2011 |
| WO | 2011/017280 A1 | 2/2011 |

OTHER PUBLICATIONS

International Application No. PCT/US2012/025572, PCT International Search Report and Written Opinion dated Jun. 10, 2013 (18 pgs).

(Continued)

*Primary Examiner* — Daniell L Negron
*Assistant Examiner* — Son M Tang
(74) *Attorney, Agent, or Firm* — Conley Rose, P.C.

(57) ABSTRACT

A system for tracking pipe activity on a rig includes a plurality of pipes, each pipe having an asset ID tag containing a code unique to the pipe. A pipe handling space for assembling and disassembling the pipes contains at least one pipe handling apparatus. A first scanning zone located at a first position in the pipe handling space contains a first reader antenna. A second scanning zone located at a second position in the pipe handling space contains a second reader antenna. At least one reader is provided for scanning the asset ID tags in the pipe handling space through at least one of the first reader antenna and the second reader antenna.

30 Claims, 5 Drawing Sheets

(56) References Cited

U.S. PATENT DOCUMENTS

| | | | |
|---|---|---|---|
| 6,543,280 B2 | 4/2003 | Duhon | |
| 6,597,175 B1 * | 7/2003 | Brisco | 324/326 |
| 6,604,063 B2 | 8/2003 | Denny et al. | |
| 6,617,963 B1 | 9/2003 | Watters et al. | |
| 6,735,630 B1 | 5/2004 | Gelvin et al. | |
| 6,759,968 B2 * | 7/2004 | Zierolf | 340/854.8 |
| 6,789,619 B2 | 9/2004 | Carlson et al. | |
| 6,826,607 B1 | 11/2004 | Gelvin et al. | |
| 6,832,251 B1 | 12/2004 | Gelvin et al. | |
| 6,859,831 B1 | 2/2005 | Gelvin et al. | |
| 6,917,291 B2 * | 7/2005 | Allen | 340/572.1 |
| 6,973,416 B2 | 12/2005 | Denny et al. | |
| 6,989,764 B2 * | 1/2006 | Thomeer et al. | 340/853.2 |
| 7,014,100 B2 | 3/2006 | Zierolf | |
| 7,020,701 B1 | 3/2006 | Gelvin et al. | |
| 7,062,413 B2 | 6/2006 | Denny et al. | |
| 7,066,256 B2 | 6/2006 | Dillenbeck et al. | |
| 7,159,654 B2 | 1/2007 | Ellison et al. | |
| 7,293,715 B2 | 11/2007 | Bargach et al. | |
| 7,296,462 B2 | 11/2007 | Gregory et al. | |
| 7,389,205 B2 | 6/2008 | Denny et al. | |
| 7,458,421 B2 | 12/2008 | Barrow et al. | |
| 7,472,749 B2 | 1/2009 | Churchill | |
| 7,484,625 B2 | 2/2009 | Scott et al. | |
| 7,513,425 B2 * | 4/2009 | Chung | 235/385 |
| 7,557,492 B2 | 7/2009 | Fripp et al. | |
| 7,603,296 B2 | 10/2009 | Whiteley et al. | |
| 7,677,439 B2 | 3/2010 | Zierolf | |
| 7,688,210 B2 * | 3/2010 | Staff | 340/572.8 |
| 7,712,527 B2 | 5/2010 | Roddy | |
| 7,781,939 B2 | 8/2010 | Fripp et al. | |
| 7,797,367 B1 | 9/2010 | Gelvin et al. | |
| 7,804,400 B2 | 9/2010 | Muirhead | |
| 7,828,060 B2 | 11/2010 | Churchill | |
| 7,839,289 B2 | 11/2010 | Chung et al. | |
| 7,844,687 B1 | 11/2010 | Gelvin et al. | |
| 7,877,235 B2 | 1/2011 | McConnell et al. | |
| 7,887,271 B2 | 2/2011 | Perkin et al. | |
| 7,912,678 B2 | 3/2011 | Denny et al. | |
| 7,969,284 B2 * | 6/2011 | Ovard et al. | 340/10.4 |
| 8,016,037 B2 * | 9/2011 | Bloom et al. | 166/255.1 |
| 8,378,841 B2 * | 2/2013 | Stevens et al. | 340/854.6 |
| 8,659,420 B2 * | 2/2014 | Salvat, Jr. | 340/539.13 |
| 8,681,000 B2 * | 3/2014 | August et al. | 340/572.1 |
| 8,684,084 B2 * | 4/2014 | Wesson et al. | 166/298 |
| 8,710,714 B2 * | 4/2014 | Loi et al. | 310/313 R |
| 2003/0220711 A1 * | 11/2003 | Allen | 700/215 |
| 2005/0230109 A1 | 10/2005 | Kammann et al. | |
| 2006/0077039 A1 * | 4/2006 | Ibi et al. | 340/10.1 |
| 2006/0087448 A1 | 4/2006 | Den Boer et al. | |
| 2007/0023185 A1 | 2/2007 | Hall et al. | |
| 2007/0124220 A1 | 5/2007 | Griggs et al. | |
| 2007/0145129 A1 | 6/2007 | Perkin et al. | |
| 2008/0105427 A1 | 5/2008 | Hampton et al. | |
| 2009/0055293 A1 | 2/2009 | Mueller | |
| 2009/0121895 A1 | 5/2009 | Denny et al. | |
| 2009/0188675 A1 | 7/2009 | Bloom et al. | |
| 2009/0205820 A1 | 8/2009 | Koederitz et al. | |
| 2009/0208295 A1 | 8/2009 | Kinert et al. | |
| 2009/0223200 A1 | 9/2009 | Kinert et al. | |
| 2009/0248307 A1 | 10/2009 | Barrow et al. | |
| 2009/0283454 A1 | 11/2009 | Scott et al. | |
| 2009/0303003 A1 | 12/2009 | Pritchard et al. | |
| 2010/0039280 A1 | 2/2010 | Holm et al. | |
| 2010/0171593 A1 | 7/2010 | Zierolf | |
| 2010/0245075 A1 | 9/2010 | Stevens et al. | |
| 2010/0290359 A1 | 11/2010 | Dewey et al. | |
| 2011/0027670 A1 | 2/2011 | Shurtleff et al. | |
| 2011/0163857 A1 * | 7/2011 | August et al. | 340/10.42 |
| 2012/0075113 A1 * | 3/2012 | Loi et al. | 340/854.6 |
| 2012/0212326 A1 * | 8/2012 | Christiansen et al. | 340/10.1 |
| 2014/0174732 A1 * | 6/2014 | Goodwin et al. | 166/255.1 |

OTHER PUBLICATIONS

Canadian Patent Application No. 2,827,660, Office Action dated Sep. 16, 2014 (4 pgs).

* cited by examiner

SYSTEM AND METHOD FOR TRACKING PIPE ACTIVITY ON A RIG

CROSS-REFERENCE TO RELATED APPLICATIONS

This application is a non-provisional application claiming priority to provisional application Ser. No. 61/443,790, filed on Feb. 17, 2011, entitled "System and Method for Tracking Pipe Activity on a Rig," the entire disclosure of which is incorporated by reference herein.

BACKGROUND

U.S. Pat. No. 5,202,680 (Savage; published 13 Apr. 1993) discloses a system for automatic tallying of drill string components. In the Savage patent, an identification (ID) tag reader antenna, connected to a reader by means of wiring or cable, is placed between a rotary table and a bell nipple. Uniquely-coded electronic ID tags are embedded in recesses in pin ends of components of a drill string. As the drill string moves through the rotary table and bell nipple and past the reader antenna, each ID tag receives an electromagnetic (EM) signal from the reader antenna via its own internal antenna. The Savage patent discloses that the energy received from the reader transmission by the ID tag is sufficient to enable the ID tag to retransmit a uniquely-coded binary signal back to the reader. The Savage patent discloses that the tallies collected could be used to compute and record various service factors that serve as a measure of wear and useful service life of drill string components.

U.S. Patent Application Publication No. 2002/0158120 (Zierolf; published 31 Oct. 2002) discloses a process and assembly for identifying and tracking assets such as tubulars. In the Zierolf publication, tubulars in a tubing string are tagged with radio frequency identification (RFID) devices. An external antenna is electrically connected to each RFID device to extend the read range of the RFID device. The Zierolf publication reports a read range of up to 15 inches or more with the external antenna. A handheld transceiver connected to a handheld wand is used to read the RFID devices. The handheld wand is held manually adjacent to the tubulars or can be secured in a stationary position adjacent to the tubulars. The transceiver transmits a radio frequency (RF) in the direction of the tubing string through the wand. As the antenna on a given tubular passes the wand, the signal coming out of the wand is received by the antenna and transmitted to the corresponding RFID device. The RFID device detects the signal and sends a RF response through the antenna and wand to the transceiver.

There are various challenges in designing a system that automatically tracks pipe activity on a rig. For example, there is a limited vertical free air space between the rotary table and the bell nipple due to horizontal steel surfaces that clip the magnetic fields in this space. The vertical free air space dictates the time available for communication between the reader antenna and an ID tag. The challenge then becomes whether the reader antenna placed underneath the rotary table will have sufficient time to power up and read the ID tag while the pipe carrying the ID tag is moving vertically through the rotary table and bell nipple. There are also electrical and EM noises on the rig that could interfere with the readings made via the reader antenna. In many cases, rigs do not follow standard electromagnetic compatibility guidelines. This means that some machinery and wiring on rigs will have electromagnetic field leakage from wiring that may interfere with the operation of other machinery or instrumentation on the rig.

SUMMARY

In one embodiment of the invention, a system for tracking pipe activity on a rig comprises a plurality of pipes, each pipe having an asset ID tag containing a code unique to the pipe. The system includes a pipe handling space for assembling and disassembling the pipes. The pipe handling space contains at least one pipe handling apparatus. The system includes a first scanning zone located at a first position in the pipe handling space. The first scanning zone contains a first reader antenna. The system includes a second scanning zone located at a second position in the pipe handling space. The second scanning zone contains a second reader antenna. The system includes at least one reader for scanning the asset ID tags in the pipe handling space through at least one of the first antenna and the second antenna.

In one embodiment, the system further includes a controller in communication with the at least one reader. The controller includes a processing means for updating an activity record of each of the pipes. In one embodiment, the system further includes a storage means for storing ID asset tag readings made by the at least one reader.

In one embodiment, the system further includes a drill floor, where the pipe handling space contains a portion of the drill floor. In one embodiment, the first position is closer to the drill floor than is the second position. In one embodiment, the pipe handling apparatus is located at or near the drill floor, and the first position is below the pipe handling apparatus. In one embodiment, the pipe handling apparatus is a rotary table. In one embodiment, the pipe handling space further contains an additional pipe handling apparatus located above the drill floor. In one embodiment, the additional pipe handling apparatus is a roughneck having gripping means for making or breaking connections between the pipes.

In one embodiment, at least one of the first reader antenna and second reader antenna is an articulated reader antenna having a plurality of communication antennas on movable arms. The movable arms define a space for receiving the pipes, and a size of the space is adjustable by movement of the movable arms. In one embodiment, the articulated reader antenna further comprises a loop power antenna surrounding the communication antenna.

In one embodiment, at least one of the first reader antenna and second reader antenna is a clam-shell reader antenna having a plurality of communication antennas on a pair of clam shells. The clam shells define a space for receiving the pipes, and a size of the space is adjustable by movement of the clam shells. In one embodiment, the clam-shell reader antenna further comprises a plurality of power antennas on the pair of claim shells.

In one embodiment, at least one of the first reader antenna and second reader antenna is movable relative to the pipe handling space.

In one embodiment, the asset ID tags are long wavelength ID tags. In one embodiment, the asset ID tags are RuBee tags. In one embodiment, the at least one reader is configured to communicate with the asset ID tags using RuBee protocol.

In one embodiment, the pipe handling apparatus is selected from the group consisting of rotary table, slips, elevator, spider, power tongs, backup units, roughneck, and top drive.

In another embodiment of the invention, a method for tracking pipe activity on a rig includes attaching a pipe stand to a drill string. The drill string is lowered through a drill floor into a well. The drill string is scanned for an asset ID tag. A reading is obtained via the scanning to determine an asset composition of the pipe stand. The asset composition indicates a string of pipes in the pipe stand. An activity record of one or more of the pipes in the pipe stand is updated.

In one embodiment, the method further comprises building a plurality of pipe stands and recording an asset composition of each pipe stand built in a database prior to the attaching the pipe stand to the drill string. In one embodiment, the pipe stand for the attaching is selected from the pipe stands built in built in the building. In one embodiment, using the reading includes retrieving the asset composition of the pipe stand from the database.

The method may also include attaching an additional pipe stand to the drill string and repeating the lowering, the scanning, the using, and the updating for the additional pipe stand.

The method may further include pulling the drill string out of the well through the drill floor. The drill string is scanned for an asset ID tag via a first antenna positioned near the drill floor. The drill string is scanned for an asset ID tag via a second antenna positioned farther from the drill floor than the first antenna. Using one or more readings obtained from the scanning via the first antenna or the second antenna to determine an asset composition of a pipe stand pulled out of the well with the drill string is determined. An activity record of one or more of the pipes in the pipe stand pulled out of the well is updated.

In a further embodiment, an apparatus for tracking tagged tubulars includes a first tag reader antenna, a second tag reader antenna, and a tag reader. The first tag reader antenna is disposed proximate a drill floor, and configured to detect signals emitted by a tag attached to a tubular. The second tag reader antenna is disposed farther from the drill floor than the first tag reader antenna, and configured to detect signals emitted by the tag attached to the tubular. The tag reader is configured to receive identification information transmitted by the tag attached to the tubular as the tubular moves past at least one of the first tag reader antenna and the second tag reader antenna. The first tag reader antenna is separated from the second tag reader antenna by a distance that is a function of distance of separation between two tags attached to the tubular. Each of the first tag reader antenna and the second tag reader antenna comprises a plurality of sections, each section radially moveable with respect to a longitudinal axis of the tubular.

It is to be understood that both the foregoing summary and the following detailed description are exemplary of the invention and are intended to provide an overview or framework for understanding the nature and character of the invention as it is claimed. The principles disclosed have broad application, and the discussion of any implementation is meant only to illustrate that embodiment, and not intended to intimate that the scope of the disclosure, including the claims, is limited to that embodiment. The accompanying drawings are included to provide a further understanding of the invention and are incorporated in and constitute a part of this specification. The drawings illustrate various embodiments of the invention and together with the description serve to explain the principles and operation of the invention.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through direct engagement of the devices or through an indirect connection via other devices and connections. The recitation "based on" means "based at least in part on." Therefore, if X is based on Y, X may be based on Y and any number of other factors.

DETAILED DESCRIPTION

Additional features and advantages of the invention will be set forth in the detailed description that follows and, in part, will be readily apparent to those skilled in the art from that description or recognized by practicing the invention as described herein.

Figure 1:
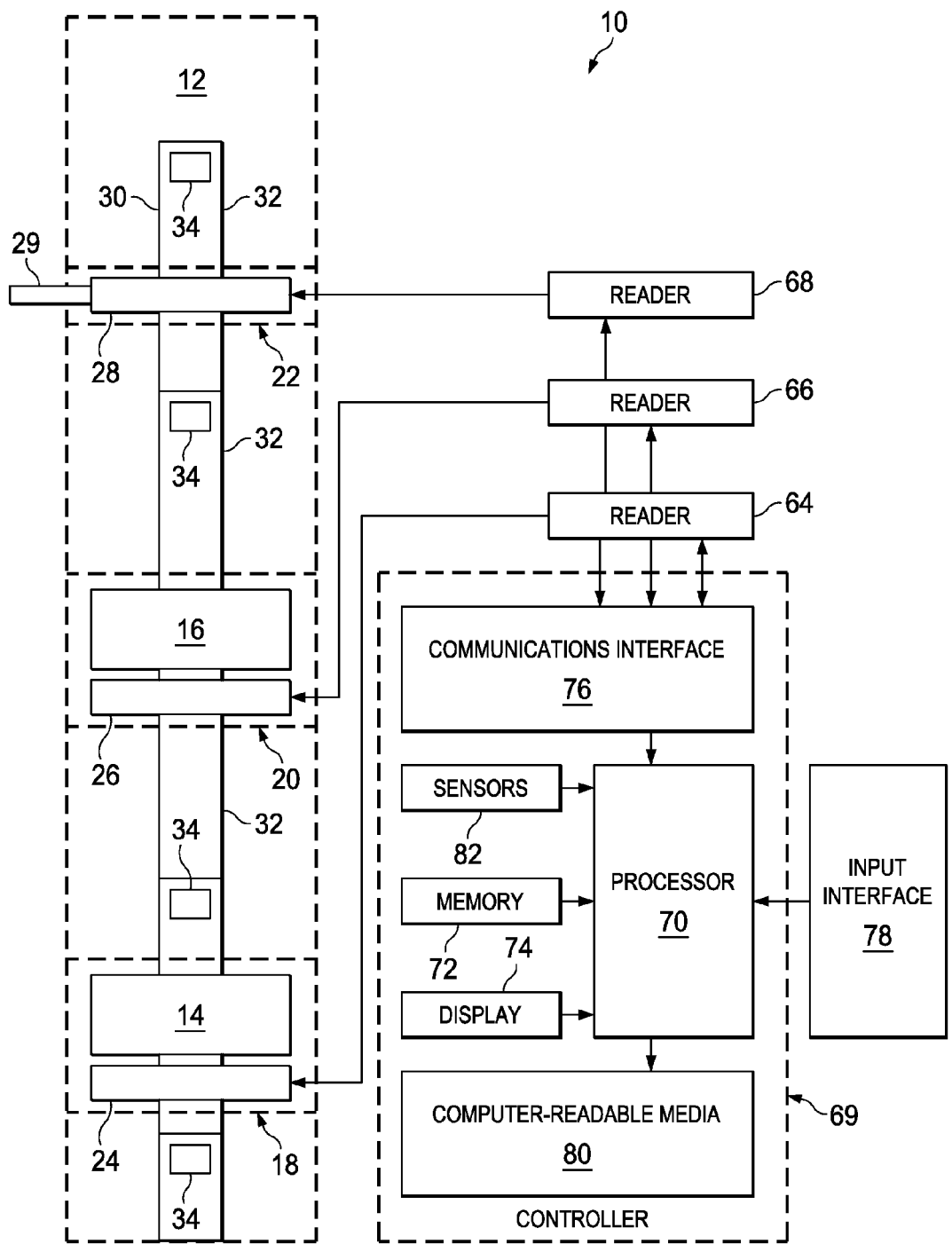
FIG. 1 is a block diagram of a system for tracking pipe activity on a rig in accordance with principles disclosed herein.
Figure 4:
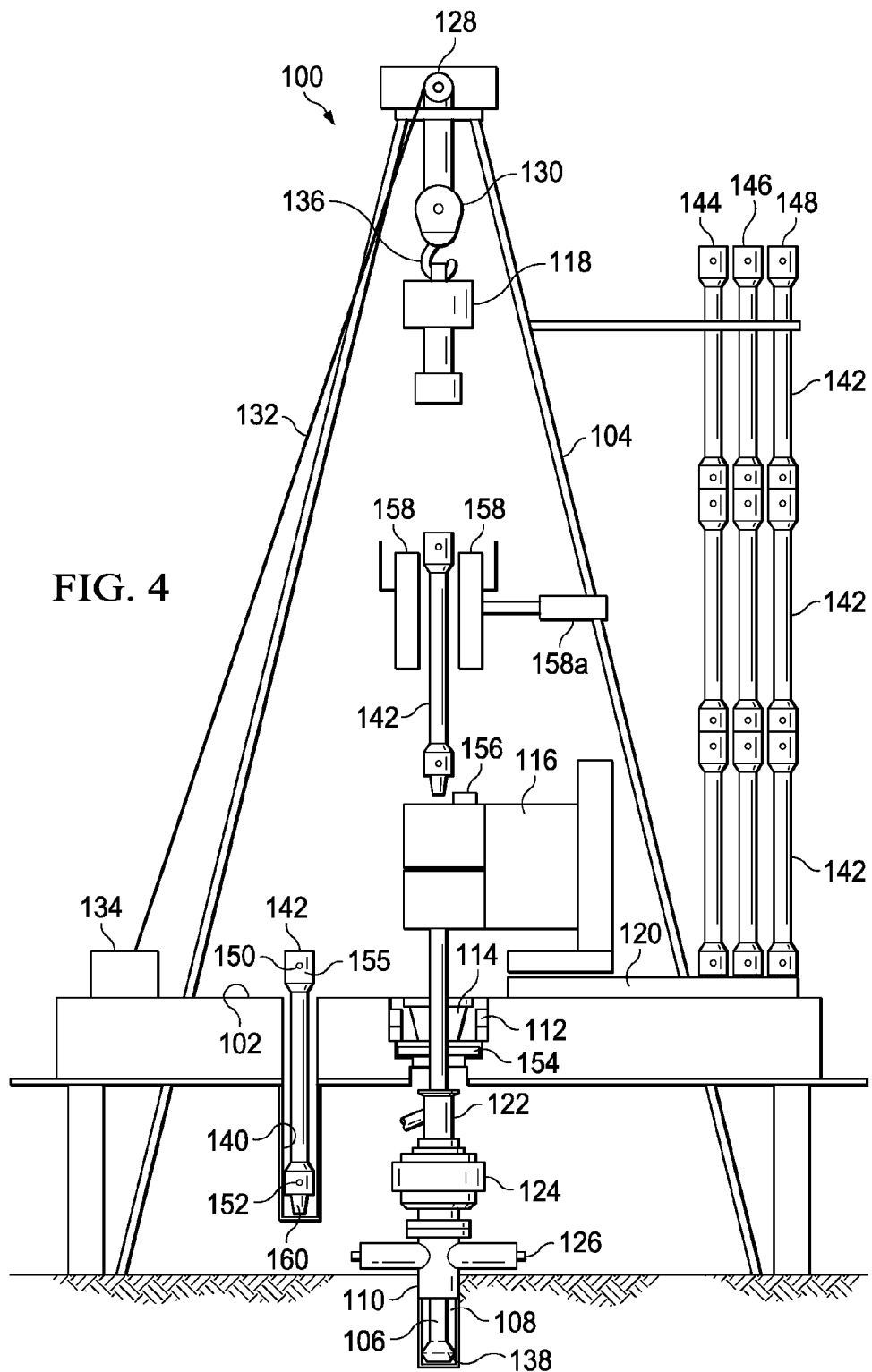
FIG. 4 is a schematic of a system for tracking pipe activity on a rig in accordance with principles disclosed herein.

FIG. 1 shows a system 10 for tracking pipe activity on a rig. The system 10 includes a pipe handling space 12. The pipe handling space 12 is a space on the rig where pipes are assembled and disassembled. The pipes could be drill pipes, riser pipes, or other types of pipes used on the rig for the purpose of forming a well in an earth formation. The rig could be a land rig or an offshore rig. Physically, the pipe handling space 12 could be defined anywhere on the rig, such as at a well, at a mousehole, or at a foxhole. The pipe handling space 12 is also a space where one or more pipe handling apparatus are situated for the purpose of performing a handling operation on a pipe. Some examples of pipe handling apparatus are rotary table, slips, elevator, spider, power tongs, backup units, roughneck, and top drive. FIG. 1 shows pipe handling apparatus 14 and 16 in the pipe handling space. Specific examples of pipe handling apparatus in a pipe handling space are shown in FIG. 4 and will be discussed herein.

The system 10 includes two or more scanning zones, such as scanning zones 18, 20, 22, along the pipe handling space 12. The scanning zones 18, 20, 22 are located at different levels on the pipe handling space 12. For discussion purposes, scanning zone 18 will be the level-1 scanning zone, scanning zone 20 will be the level-2 scanning zone, and scanning zone 22 will be the level-3 scanning zone. Each scanning zone contains a reader antenna for scanning objects passing through the pipe handling space 12 for ID tags. In FIG. 1, level-1 scanning zone 18 contains level-1 reader antenna 24, level-2 scanning zone 20 contains level-2 reader antenna 26, and level-3 scanning zone 22 contains level-3 reader antenna 28. In some cases, a scanning zone also contains a pipe handling apparatus. For example, level-1 scanning zone 18 contains pipe handling apparatus 14, and level-2 scanning zone contains pipe handling apparatus 16. In these scanning zones, the reader antenna may be mounted on, mounted inside, or positioned in close proximity to the pipe handling apparatus. In the scanning zone 22, the reader antenna 28 is movable relative to the pipe handling space 12. A motion apparatus 29 (such as a linear slide or robot) may be used to move the reader antenna 28 into and out of the pipe handling space 12 as needed. The scanning zones 18, 20, 22 are spaced apart by some distance, which in one embodiment may be selected to be of the order of a pipe length or of the order of a multiple of a pipe length.

The objects passing through the pipe handling space 12 that need to be scanned for ID tags are pipes in one embodiment. FIG. 1 shows a string of pipes 30. The pipe string 30 includes pipes 32. Each pipe 32 has at least one asset ID tag 34. The asset ID tag 34 may be attached to the pipe 32 using any suitable method. U.S. Pat. No. 7,159,654 (published 9 Jan. 2007; Ellison et al.) discloses various methods of mounting ID tags on a pipe. For example, the asset ID tags could be mounted in recesses formed in the box end or pin end of the pipe and wrapped in protective materials. For each pipe 32, each asset ID tag 34 has an asset code unique to the pipe 32. In some embodiments, the asset ID tag 34 may have memory for storing information about the pipe 32 besides the asset code. The asset ID tag 34 may be a RFID tag, which is a transponder. In a preferred embodiment, the asset ID tag 34 is a long wavelength identification (LWID) tag. A commercial example of a LWID tag is a RuBee tag, which is a transceiver. RuBee operates at low frequencies, below 450 kHz and optimally at 131 kHz, that are not attenuated by water and metal. As such, RuBee tags can be read more accurately in environments containing a high amount of liquid and metal than traditional RFID tags.

The following are some of the characteristics of RuBee (RuBee (IEEE P1902.1) Fact Sheet, February 2009 v1-6, Visible Assets, Inc.):
  RuBee is an active, wireless asset visibility technology that uses magnetic waves.
  RuBee is unaffected by water, and steel can enhance or not affect RuBee signal.
  RuBee reads in a volume and does not rely on line-of-sight.
  RuBee tags have a range of a few feet to over 50 feet depending on antenna design and tag design.
  Smart RuBee tags have a programmable microprocessor, with crystal clock for date and time, 10+ years battery life, optional sensors, and optional SRAM memory.
  RuBee protocol is an international wireless standard, IEEE 1902.1.

The system 10 includes one or more readers, such as readers 64, 66, 68. The readers 64, 66, 68 are connected to the reader antennas 24, 26, 28, respectively, via suitable wiring or cable. Each reader contains the necessary circuitry or logic to communicate with the asset ID tags in the pipe handling space 12 via the reader antennas 24, 26, 28. Each reader may have an EM signal generator to generate EM signals to send to the pipe handling space 12 during scanning of the pipe handling space 12 for asset ID tags. Each reader may provide power to its respective reader antenna. Each reader may have the capability to communicate with other systems. The readers 64, 66, 68 are capable of communicating with the asset ID tags 34 in the pipe handling space 12 using a protocol that the asset ID tags 34 understand. For example, if the asset ID tags 34 are RuBee tags, the readers 64, 66, 68 will communicate with the asset ID tags 34 using RuBee protocol. Each reader scans the pipe handling space 12 for asset ID tags 34. If an asset ID tag 34 is detected, the reader reads the asset ID tag 34. Therefore, scanning may or may not involve reading of an asset ID tag 34. It may be possible to connect all the reader antennas 24, 26, 28 to a single reader.

The system 10 includes a controller 69, which in one embodiment is implemented as a computer system. The controller 69 includes one or more of a processor 70, memory 72, display 74, communications interface (or device(s)) 76, and input interface (or device(s)) 78. The controller 69 can receive input from a user via the input interface 78. The controller 69 can send instructions to and receive responses from the readers 64, 66, 68 via the communications interface 76. Information related to operation or use of the controller 69 may be presented on the display 74. The controller logic may be loaded in the memory 72 or stored in a computer-readable media 80 for subsequent loading into the memory 72. Data from the readers 64, 66, 68 may be stored in the memory 72 or computer-readable media 80. The controller logic may include logic for tracking pipe activity, i.e., maintaining and updating activity records of pipes, and logic for collating asset ID tag readings into asset compositions of pipe stands. An asset composition of a pipe stand indicates a string of pipes in the pipe stand. The memory 72 or computer-readable media 80 may include a database for storing asset ID tag readings and asset compositions of pipe stands. The controller 69 may also receive data from instruments on sensors 82 on a rig via the communications interface 76. Such data may be useful in tracking pipe activity.

Figure 2:
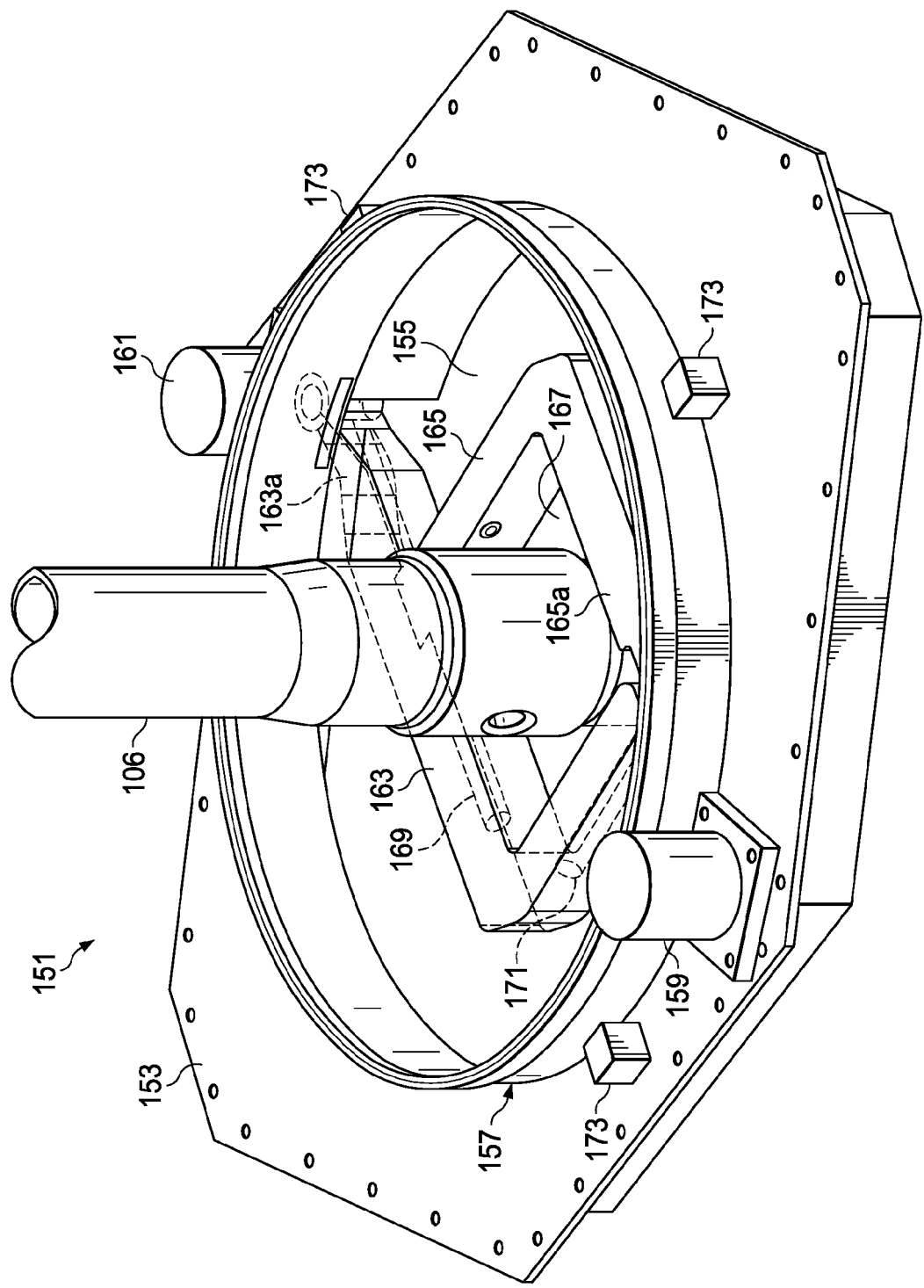
FIG. 2 is a perspective view of an articulated reader antenna in accordance with principles disclosed herein.

FIG. 2 shows an articulated reader antenna 151 that may be used as one or more of the reader antennas 24, 26, 28 in FIG. 1. The articulated reader antenna 151 includes a base 153 having an opening 155. The opening 155 is large enough for passage of various objects, such as may be included in a drill string. A loop antenna 157 is mounted on the base 153. The diameter of the loop antenna 157 is roughly the same as the diameter of the opening 155. Actuators 159, 161, such as hydraulic rotary actuators, are mounted on diametrically-opposed positions on the base 153. L-shaped arms 163, 165 are supported within the loop antenna 157. The L-shaped arms 163, 165 define a reading space 167 within the loop antenna 157. The drill string 106 passes through the reading space 167, and the reading space 167 can be adjusted to accommodate different sizes of objects in the drill string 106. Ends 163a, 165a of the L-shaped arms 163, 165 are coupled to the actuators 159, 161, respectively. The actuators 159, 161 are operable to rotate the L-shaped arms 163, 165 toward or away from the center of the loop antenna 157, thereby decreasing or increasing the reading space 167.

Communication antennas 169, 171 are embedded in the L-shaped arm 163. Similar communication antennas are embedded in the L-shaped arm 165, but these communication antennas are not visible in the drawing of FIG. 2. In one embodiment, the communication antennas 169, 171 (also the communication antennas embedded in the L-shaped arm 165) are ferrite rod antennas. A ferrite rod antenna is a coil of wire on a ferrite rod. In one embodiment, the L-shaped arms 163, 167 are molded from fiber reinforced plastic. The ferrite rod antennas could be molded into the fiber reinforced plastic. The communication antennas 169, 171 (also the communication antennas embedded in the L-shaped arm 165) are energized by the loop antenna 157. Proximity sensors 173, such as ultrasonic sensors, are mounted on the base 153 for monitoring the diameter of drill string components passing through the articulated reader antenna 151. The output of the proximity sensors 173 can be used to control the actuators 159, 161 such that the L-shaped arms 163, 165 are brought close to the center of the loop antenna 157 to read asset ID tags or moved away from the center of the loop antenna 157 to allow a larger drill string component to pass through the loop antenna 157. Although not visible in the drawing, suitable wiring is used to connect the loop antenna 157 and communication antennas 169, 171 to a reader, respectively.

Figure 3:
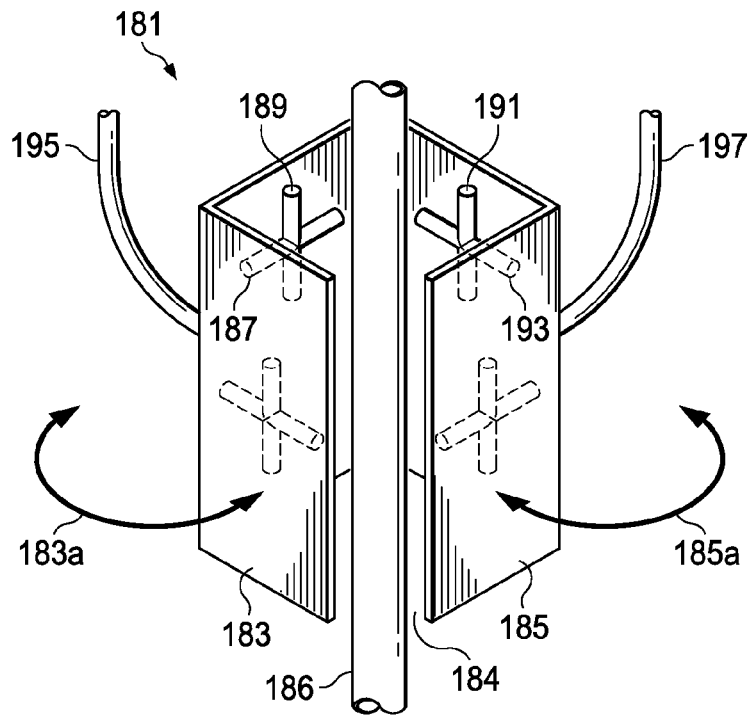
FIG. 3 is a perspective view of a clam-shell reader antenna in accordance with principles disclosed herein.

FIG. 3 shows a clam-shell reader antenna 181 that may be used as one or more of the reader antennas 24, 26, 28 of FIG. 1. The clam-shell reader antenna 181 has clam shells 183, 185 in opposing relation. The clam shells 183, 185 may be connected by one or more hinges on one side so that they can be swung toward or away from each other, as indicated by the arrows 183a, 185a. Communication antennas 187 and power antennas 189 are mounted on the clam shell 183. Similarly, communication antennas 191 and power antennas 193 are mounted on the clam shell 185. In one embodiment, the communication and power antennas are in a crossed configuration. For example, the communication antennas 187, 191 are oriented in a horizontal direction, while the power antennas 189, 193 are oriented in a vertical direction. The antennas may be ferrite rods molded into the clam shells 183, 185. Cables 195, 197 may be used to connect the antennas on the clam shells 183, 185 to a reader. The reader scans the space 184 between the clam shells 183, 185 for asset ID tags. When an object 186 carrying an asset ID tag passes through the space 184, the reader reads the asset ID tag through the communication antennas 187. An asset ID tag reading typically involves the reader sending a signal to the asset ID tag via a communication antenna and receiving a signal from the asset ID tag via the communication antenna. The space 184 between the clam shells 183, 185 may be adjusted as needed to accommodate objects of different sizes. In one embodiment, the clam shells 183, 185 are made of a magnetically-permeable material such as fiber reinforced plastic.

FIG. 4 shows a practical implementation of a system 100 for tracking pipe activity on a rig that uses the principles described above in reference to FIG. 1. The system 100 includes a drill floor 102 located under a derrick 104. The drill floor 102 is where a drill string 106 will be assembled and where the drill string 106 will begin its trip into a well 108. At the top of the well 108 is a wellhead 110. The space between the wellhead 110 and the top of the derrick 104 may be considered as the pipe handling space. A rotary table 112, slips 114, a roughneck 116, and a top drive 118 are arranged in the pipe handling space. The rotary table 112 is mounted in a hole in the drill floor 102. The slips 114 are wedges. When arranged between the rotary table 112 and drill string 106, the slips 114 prevent the drill string 106 from slipping down the rotary table 112. The roughneck 116 is mounted on a track 120 and can be moved in and out of the pipe handling space on the track 120 as needed. The roughneck 116 includes pipe gripping members that can be used to make or break connections between pipes. The drill string 106 extends from the drill floor 102 into the well 108 through a bell nipple 122, blowout preventers 124, 126, and the wellhead 110.

A crown block 128 is mounted at the top of the derrick 104, and a traveling block 130 hangs down from the crown block 128 by means of a cable or drilling line 132. One end of the cable or drilling line 132 is connected to a drawworks 134, which is a reeling device that can be used to adjust the length of the cable or drilling line so that the traveling block 130 moves up and down the derrick 104. The top drive 118 is supported on a hook 136 attached to the bottom of the traveling block 130. When the top drive 118 is coupled to the top of the drill string 106, the length of the cable or drilling line 132 can provide an indication of the position of the top of the drill string 106 relative to the drill floor 102. In FIG. 4, the top of the drill string 106 is detached from the top drive 118 to allow assembly of pipes into stands. Eventually, the top of the drill string 106 will be coupled to the top drive 118 so that the top drive 118 can be used to rotate the drill string 106 while a bit 138 at the bottom of the drill string 106 drills the well 108. A mousehole 140 in the drill floor 102 may hold a pipe 142 to be assembled into a stand or attached to the drill string 106. FIG. 4 shows stands 144, 146, 148 of pipes 142. Typically, each stand is made of three connected pipes.

Each pipe 142 has one or more asset ID tags, such as asset ID tags 150, 152 disposed at the box end 155 and pin end 160, respectively. Characteristics of asset ID tags have been discussed above with reference to FIG. 1. The system 100 has two reader antennas 154, 156. The reader antenna 154 is placed at level 1, which is close to the drill floor 102. For example, the level-1 reader antenna 154 may be placed in a substructure underneath the rotary table 112. The reader antenna 156 is placed at level 2, which is a distance above the drill floor 102. The level-2 reader antenna 156 is farther from the drill floor 102 than the level-1 reader antenna 154 is from the drill floor 102. For example, the level-2 reader antenna 156 could be placed on the roughneck 116. The system 100 may have additional levels of reader antennas. For example, a reader antenna 158 may be placed at level 3, which is a distance above the drill floor 102 and a distance above level 2. The spacing between the level-1 reader antenna 154 and level-2 reader antenna 156 may be about the separation distance between the asset ID tags 150, 152 on the pipe 142 or slightly less than the length of the pipe 142. In one embodiment, the separation distance between the antennas 154, 156 is in a range from 20 ft to 30 ft. The same separation distance range or a different one may be used between antennas 156, 158.

The level-1 reader antenna 154, which is placed underneath the rotary table 112, where there is limited free vertical air space, could be implemented as an articulated reader antenna, such as shown in FIG. 2. The articulated reader antenna would allow the communication antenna to be placed close to the asset ID tag, thereby improving signal-to-noise ratio and enabling more reliable reading of the asset ID tag. Bringing the communication antenna close to the asset ID tag would also reduce the time required for communication between the communication antenna and asset ID tag. The level-2 reader antenna 156 could be secured to the roughneck 116 using any suitable method and may even be disposed in a recess in the roughneck 116. For reading of a RuBee tag, it is not necessary that there is a line of sight between the antenna and the tag. However, for reading of a RFID tag, a line sight may be necessary. In which case, arranging the reader antenna in the roughneck 116 such that a line of sight can be established between the reader antenna and the tag may be useful. A moving apparatus 158a (such as a linear slide or robot) may be coupled to the level-3 reader antenna and used to move the level-3 reader antenna 158 into and out of the pipe handling space as needed. The level-3 antenna may be a clam-shell antenna such as shown in FIG. 3. The reader antennas 154, 156, 158 are connected to readers as explained above with reference to FIG. 1.

Figure 7:
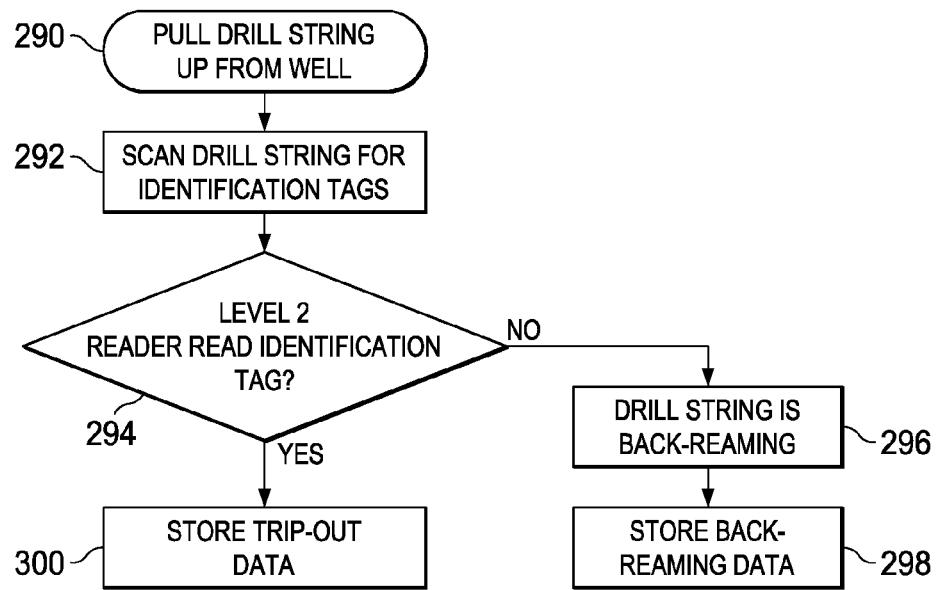
FIG. 7 is a flowchart illustrating a method of tracking pipe activity during tripping out or back-reaming of a drill string in accordance with principles disclosed herein.
Figure 5:
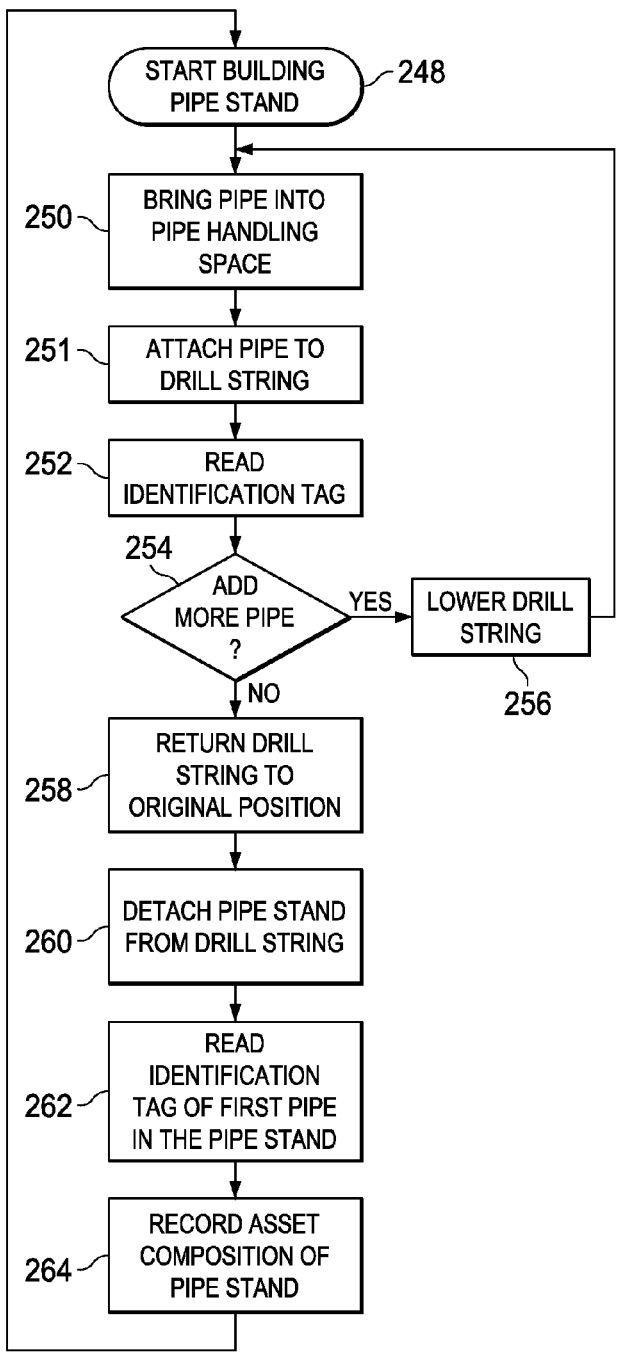
FIG. 5 is a flowchart illustrating a method of building pipe stands in accordance with principles disclosed herein.
Figure 6:
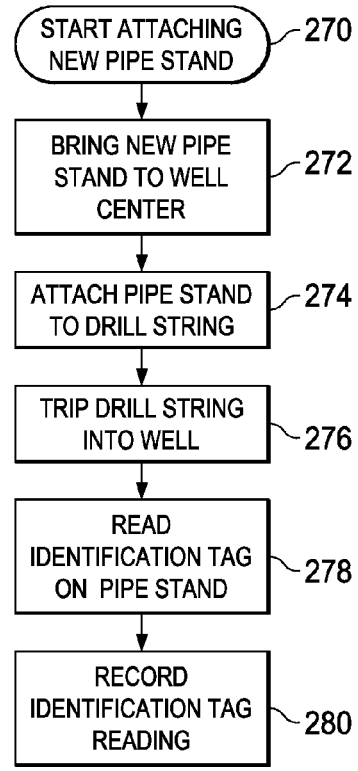
FIG. 6 is a flowchart illustrating a method of tracking pipe activity during tripping in of a drill string in accordance with principles disclosed herein.

FIGS. 5-7 illustrate a method of tracking pipe activity on a rig using the system of FIG. 4, which is based on the system of FIG. 1. In FIG. 5, pipe stands are built and asset compositions of the pipe stands are recorded in a database for future use. At 248, a process of building a new pipe stand is started. At 250, a pipe (142 in FIG. 4) is brought, e.g., from the mousehole (140 in FIG. 4), into the pipe handling space. The roughneck (116 in FIG. 4) is also brought into the pipe handling space, if not already there, and used to connect the pipe to the drill string (106 in FIG. 4), which is being held in the rotary table (112 in FIG. 4) via the slips (114 in FIG. 4). At 251, the drill pipe is attached to the drill string by the roughneck. At 252, while the roughneck is making up the connection between the drill pipe and the drill string, the level-2 reader reads the asset ID tag (152 in FIG. 4) at the pin end of the pipe via the level-2 reader antenna (156 in FIG. 4). At 254, a determination is made about adding more pipes to the current stand. At 256, if more pipes are to be added to the stand, the slips are released, the drill string is lowered by the length of one drill pipe, the slips are set again, and steps 250, 251, 252, and 254 are repeated. At 258, if more pipes will not be added to the pipe stand, the slips are released and the drill string is returned to its original position. Then, at 260, the drill pipe stand is detached from the drill string using the roughneck. At 262, while detaching the pipe stand from the drill string, the level-2 reader reads the asset ID tag on the first pipe in the pipe stand via the level-2 reader antenna.

From the above, if there are three pipes in the pipe stand, the level-2 reader would make four readings: READING 1 (corresponding to the first pipe in the stand), READING 2 (corresponding to the second pipe in the stand), READING 3 (corresponding to the third pipe in the stand), and READING 4 (corresponding to the first pipe in the stand). This series of readings will define the asset composition, i.e., pipe string configuration, of the pipe stand. At 264, the asset composition of the pipe stand is recorded in a database, which may be stored, for example, in the memory of the controller (69 in FIG. 1) or in a computer-readable media (80 in FIG. 1). Additional pipe stands can be built by returning to step 248. It should be noted that stands may be built off the well center. The stands could be built at a foxhole or mousehole, for example. It is possible in this case to use a handheld antenna and reader to read the tags in the appropriate order while building the stands. It is also possible to mount antennas in a pipe handling space defined at these offline locations and to use the antennas and readers to read the tags in the appropriate order while building the stands. Such readings can be recorded in the database as described above.

In FIG. 6, pipe activity is tracked while a drill string is tripped into a well. At 270, a process of attaching a new pipe stand, whose asset composition has been recorded in the database, is started. At 272, the new pipe stand (e.g., 144 in FIG. 4) is brought to the well center. At 274, the pipe stand is attached to the drill string while the drill string is held in the slips (114 in FIG. 4) in the rotary table (112 in FIG. 4). The roughneck (116 in FIG. 4) or other device may be used to attach the pipe stand to the drill string. At 276, the slips are released and the drill string is tripped into (lowered into) the well. At 278, as the new pipe stand attached to the drill string passes through the rotary table, the level-1 reader, via the level-1 reader antenna (154 in FIG. 4), reads an asset ID tag on the pipe stand. The level-1 reader only needs to read a single asset ID tag on the pipe stand to identify all the pipes in the stand. At 280, the trip-in data is recorded. The trip-in data includes the asset ID tag reading, which can be used to retrieve the asset composition of the pipe, and the position of the stand in the drill string. Starting at the bit, a record of the order in which pipe stands are added to the drill string is kept. This makes it possible to determine the position of any stand in the drill string.

In FIG. 7, pipe activity is tracked while a drill string is tripped out or back-reamed from the well. At 290, the drawworks (134 in FIG. 4) is operated to pull the drill string up from the well. At 292, the level-1 reader antenna (154 in FIG. 1) scans the drill string for asset ID tags as the drill string passes through the rotary table (112 in FIG. 4). The level-1 reader reads an asset ID tag on a pipe when it detects the asset ID tag. At 292, the level-2 reader antenna (156 in FIG. 4) also scans for asset ID tags and the level-2 reader may read an asset ID tag on a pipe if an asset ID tag is detected. At 294, a determination is made to see if the level-2 reader has read an asset ID tag on a pipe. At 296, if the level-2 reader antenna has not read an asset ID tag, then the drill string is back-reaming and a pipe has not been removed from the drill string. Removal of a pipe from the drill string would involve use of the roughneck (116 in FIG. 4) in the setup shown in FIG. 4. The back-reaming data is stored in the database. The back-reaming data includes the asset ID tag reading by the level-1 reader. At 300, if the level-2 reader antenna has also read an asset ID tag, then one or more pipe stands are being removed from the drill string. The trip-out data, which includes the readings made by the level-1 reader antenna and level-2 reader antenna, is stored in the database.

The trip-in data, the trip-out data, and the back-reaming data can be used to update the pipe activity. The trip-in data, trip-out data, and the back-reaming data contain asset ID tag readings that can be used to retrieve asset compositions of pipe stands from the database. In one embodiment, each pipe has an activity record. The pipes involved in activities on the rig can be identified using the trip-in, trip-out, and back-reaming data. Once these pipes are identified, their activity records can be updated accordingly. The processor 70 may handle the updating of the activity records as needed. Each asset ID tag reading may be time-stamped so that the length of each pipe activity can be determined and included in the corresponding activity record. Using the number of times a pipe is active (i.e., in use) and the length of time the pipe is active and in what situations the pipe is active, it may be possible to determine the wear or fatigue level of the pipe.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A system for tracking pipe activity on a rig, comprising:
   a plurality of pipes, each pipe having an asset ID tag containing a code unique to the pipe;
   a pipe handling space for assembling and disassembling the pipes, the pipe handling space containing at least one pipe handling apparatus;
   a first scanning zone located at a first position in the pipe handling space, the first scanning zone containing a first reader antenna;
   a second scanning zone located at a second position in the pipe handling space, the second scanning zone containing a second reader antenna;
   at least one reader for scanning the asset ID tags in the pipe handling space through at least one of the first antenna and the second antenna;
   wherein the first reader antenna is separated from the second reader antenna by a distance that is a function of distance of longitudinal separation between two tags attached to the pipes.

2. The system of claim 1, further comprising a controller in communication with the at least one reader, the controller comprising a processing means for updating an activity record of each of the pipes.

3. The system of claim 1, further comprising a storage means for storing asset ID tag readings made by the at least one reader.

4. The system of claim 1, wherein the pipe handling apparatus is a rotary table.

5. The system of claim 1, further comprising a drill floor, wherein the pipe handling space intersects the drill floor.

6. The system of claim 5, wherein the first position is closer to the drill floor than is the second position.

7. The system of claim 5, wherein the pipe handling apparatus is located at or near the drill floor, and wherein the first position is below the pipe handling apparatus.

8. The system of claim 5, wherein the pipe handling space further contains an additional pipe handling apparatus located above the drill floor.

9. The system of claim 8, wherein the additional pipe handling apparatus is a roughneck having gripping means for making or breaking connections between the pipes.

10. The system of claim 1, wherein at least one of the first reader antenna and second reader antenna is an articulated reader antenna having a plurality of communication antennas on movable arms, the movable arms defining a space for receiving the pipes, a size of the space being adjustable by movement of the movable arms.

11. The system of claim 10, wherein the articulated reader antenna further comprises a loop power antenna surrounding the communication antennas.

12. The system of claim 1, wherein at least one of the first reader antenna and second reader antenna is a clam reader antenna having a plurality of communication antennas on a pair of clam shells, the clam shells defining a space for receiving the pipes, a size of the space being adjustable by movement of the clam shells.

13. The system of claim 12, wherein the clam reader antenna further comprises a plurality of power antennas on the pair of clam shells.

14. The system of claim 1, wherein at least one of the first reader antenna and second reader antenna is movable relative to the pipe handling space.

15. The system of claim 1, wherein the asset ID tags are long wavelength ID tags.

16. The system of claim 1, wherein the first reader antenna is separated from the second reader antenna by at least 20 feet.

17. The system of claim 16, wherein the at least one reader is configured to communicate with the asset ID tags using RuBee protocol.

18. The system of claim 1, wherein the pipe handling apparatus is selected from a group consisting of rotary table, slips, elevator, spider, power tongs, backup units, roughneck, and top drive.

19. Apparatus for tracking tagged tubulars, comprising:
a first tag reader antenna disposed proximate a drill floor, and configured to detect signals emitted by a tag attached to a tubular;
a second tag reader antenna disposed farther from the drill floor than the first tag reader antenna, and configured to detect signals emitted by the tag attached to the tubular; and
a tag reader configured to receive identification information transmitted by the tag attached to the tubular as the tubular moves past at least one of the first tag reader antenna and the second tag reader antenna;
wherein the first tag reader antenna is separated from the second tag reader antenna by a distance that is a function of distance of separation between two tags attached to the tubular;
wherein each of the first tag reader antenna and the second tag reader antenna comprises a plurality of sections, each section radially moveable with respect to a longitudinal axis of the tubular.

20. The apparatus of claim 19, wherein the first tag reader antenna is disposed beneath a rotary table, and the second tag reader antenna is disposed above the drill floor.

21. The apparatus of claim 19, wherein each of the first tag reader antenna and the second tag reader antenna comprises a plurality of communication antennas and a power antenna.

22. The apparatus of claim 21, wherein the power antenna is disposed perpendicular to the longitudinal axis of the tubular, and the communication antennas are disposed parallel to the longitudinal axis of the tubular.

23. The apparatus of claim 2, wherein the first tag reader antenna is separated from the second tag reader antenna by at least 20 feet.

24. The apparatus of claim 19, wherein at least one of the first tag reader antenna and the second tag reader antenna comprises a proximity sensor configured to determine a distance between the tubular and the antenna, and wherein the antenna is configured to change positions based on an output of the proximity sensor indicating that diameter of the tubular has changed.

25. Apparatus for tracking tagged tubulars, comprising:
a first tag reader antenna disposed proximate a drill floor, and configured to detect signals emitted by a tag attached to a tubular;
a second tag reader antenna disposed farther from the drill floor than the first tag reader antenna, and configured to detect signals emitted by the tag attached to the tubular; and
a tag reader configured to receive identification information transmitted by the tag attached to the tubular as the tubular moves past at least one of the first tag reader antenna and the second tag reader antenna;
wherein the first tag reader antenna is separated from the second tag reader antenna by a distance that is a function of distance of separation between two tags attached to the tubular.

26. The apparatus of claim 25, wherein each of the first tag reader antenna and the second tag reader antenna comprises a plurality of sections, each section radially moveable with respect to a longitudinal axis of the tubular.

27. The apparatus of claim 25, wherein each of the first tag reader antenna and the second tag reader antenna comprises a plurality of communication antennas and a power antenna.

28. The apparatus of claim 27, wherein the power antenna is disposed perpendicular to the longitudinal axis of the tubular, and the communication antennas are disposed parallel to the longitudinal axis of the tubular.

29. The apparatus of claim 25, wherein the first tag reader antenna is separated from the second tag reader antenna by at least 20 feet.

30. The apparatus of claim 25, wherein at least one of the first tag reader antenna and the second tag reader antenna comprises a proximity sensor configured to determine a distance between the tubular and the antenna, and wherein the antenna is configured to change positions based on an output of the proximity sensor indicating that diameter of the tubular has changed.

* * * * *